United States Patent
Thien et al.

(10) Patent No.: US 12,210,689 B2
(45) Date of Patent: Jan. 28, 2025

(54) INFORMATION HANDLING SYSTEM AND KVM DISPLAY AUTOMATED CONFIGURATION

(71) Applicant: Dell Products L.P., Round Rock, TX (US)

(72) Inventors: Vui Khen Thien, Singapore (SG); Aik Keong Ong, Singapore (SG)

(73) Assignee: Dell Products L.P., Round Rock, TX (US)

( * ) Notice: Subject to any disclaimer, the term of this patent is extended or adjusted under 35 U.S.C. 154(b) by 120 days.

(21) Appl. No.: 17/956,242

(22) Filed: Sep. 29, 2022

(65) Prior Publication Data

US 2024/0111369 A1  Apr. 4, 2024

(51) Int. Cl.
G06F 3/023 (2006.01)
G06F 3/0354 (2013.01)
G06F 3/038 (2013.01)
G06F 13/38 (2006.01)
G06F 13/42 (2006.01)

(52) U.S. Cl.
CPC .......... *G06F 3/023* (2013.01); *G06F 3/03543* (2013.01); *G06F 3/038* (2013.01); *G06F 13/382* (2013.01); *G06F 13/4282* (2013.01); *G06F 2213/0042* (2013.01)

(58) Field of Classification Search
CPC ...... G06F 3/023; G06F 3/03543; G06F 3/038; G06F 13/382; G06F 13/4282; G06F 2213/0042
See application file for complete search history.

(56) References Cited

U.S. PATENT DOCUMENTS

| | | | |
|---|---|---|---|
| 8,209,438 B2 | 6/2012 | Bauch et al. | |
| 8,374,889 B2 | 2/2013 | Arthur | |
| 8,671,235 B2 | 3/2014 | Tung et al. | |
| 9,378,703 B2 | 6/2016 | Nakano | |
| 10,585,731 B2 | 3/2020 | Soffer | |
| 2008/0126629 A1 | 5/2008 | Huang | |
| 2008/0147922 A1 | 6/2008 | Chou | |
| 2010/0180055 A1* | 7/2010 | Lyon | G06F 3/038 710/316 |

OTHER PUBLICATIONS

U.S. Appl. No. 17/731,674, filed Apr. 28, 2022, entitled "Keyboard Video Mouse Automated Setup With Plural Information Handling Systems," by inventors Khang Chian Yong et al.
U.S. Appl. No. 17/667,079, filed Feb. 8, 2022, entitled "Multi-KVM Multi-Client Information Handling System Support," by inventors Vui Khen Thien and Tze Fung Chung.

* cited by examiner

*Primary Examiner* — Jonathan A Boyd
(74) *Attorney, Agent, or Firm* — Zagorin Cave LLP; Robert W. Holland

(57) ABSTRACT

A display keyboard, video, mouse (KVM) switch associates video and data ports with an information handling system by communicating identifiable information between the KVM switch and information handling system through both video and data ports to confirm which of the data ports is associated with a video port that presents visual images of the information handling system. The identifiable information includes a unique token or virtual mouse inputs communicated as data to an information handling system that are detected in visual information communicated as mouse cursor movements.

20 Claims, 6 Drawing Sheets

INFORMATION HANDLING SYSTEM AND KVM DISPLAY AUTOMATED CONFIGURATION

BACKGROUND OF THE INVENTION

Field of the Invention

The present invention relates in general to the field of portable information handling systems, and more particularly to an information handling system dual pivot hinge signal path.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems integrate processing components that cooperate to process information, such as a central processing unit (CPU) that executes instructions to process information and a random access memory (RAM) that stores the instructions and information. Generally, information handling systems accept inputs from input/output (I/O) devices and present results at a display as visual images. Desktop or other types of stationary information handling systems typically accept inputs through peripheral keyboard and mouse devices and output results through peripheral displays. Portable information handling systems generally include a keyboard and display in a portable housing but also interface with peripheral devices, which tend to offer a more favorable interface.

Enterprises will sometimes maintain work stations for employees to use that include a desktop information handling system supported by a peripheral display, peripheral keyboard and peripheral mouse. In some instances, employees will also have a portable information handling system with them at the work station and will want to use the peripheral devices with the portable information handling system. One option to allow this is to have a keyboard, video, mouse (KVM) switch included with the display. The end user can interface the portable information handling system with the KVM switch and then select whether to use the desktop or portable system to interact with the display and input peripherals. The end user toggles the KVM switch to change which of the desktop and portable system is active.

One difficulty with the use of a KVM switch is that it typically includes multiple data and video ports to accept cables from multiple information handling systems. In some cases, the data interface, such as a USB Type A or B cable, communicates peripheral device inputs to the information handling system while a separate video interface, such as HDMI or DisplayPort, communicates video from the information handling system to the display. If the KVM switch does not correctly associate video and data ports with each of the information handling systems, then keyboard and mouse inputs to the KVM switch will communicate with an information handling system that is not presenting visual images at the display. Unfortunately, setting up a KVM switch to correctly interact with multiple information handling systems can be a complex and time intensive task that involves testing the configuration and adjusting configuration settings through a manual interface. This can result in portable information handling system end users avoiding interactions with peripherals that could be available to them.

SUMMARY OF THE INVENTION

Therefore, a need has arisen for a system and method which automatically associates an information handling system data and video interface with a KVM switch port.

In accordance with the present invention, a system and method are provided which substantially reduce the disadvantages and problems associated with previous methods and systems that configure a display KVM switch. Identifiable information communicated between the information handling system and KVM switch data and video ports is automatically applied to associate the information handling system with a video and data port of the KVM switch.

More specifically, an information handling system processes information with a processor and memory for presentation at a display as visual images. The display includes a keyboard, video, mouse (KVM) switch that has plural data ports and plural video ports to coordinate interactions by plural information handling systems with the display and with peripherals interfaced at the display to KVM switch ports, such as a mouse and keyboard. At initial configuration when an information handling system couples to a video and data port of the KVM switch, a process is automatically performed that associates the information handling system with one of each of the plural data and plural video ports of the information handling system. The association is coordinated by an exchange of identifiable information, such as unique token or virtual mouse inputs, so that both a data port and a video port of a KVM switch are selected for use with the information handling system.

The present invention provides a number of important technical advantages. One example of an important technical advantage is that an information handling system automatically configures when coupled to a display KVM switch without manual intervention by an end user. The automated configuration is performed unseen by the end user so that an information handling system couples to any video and data ports of the KVM switch and simply starts to work. The automated exchange of identifiable information is particularly helpful where a KVM switch includes video and data ports that support three or more information handling systems. In an enterprise work station scenario, an end user with a portable information handling system can more quickly and readily interact with fixed peripheral assets through a display KVM switch without spending excessive amounts of time to set up the work station.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system and KVM switch associated data and video ports by communication of identifiable information, such as unique tokens virtual mouse inputs. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
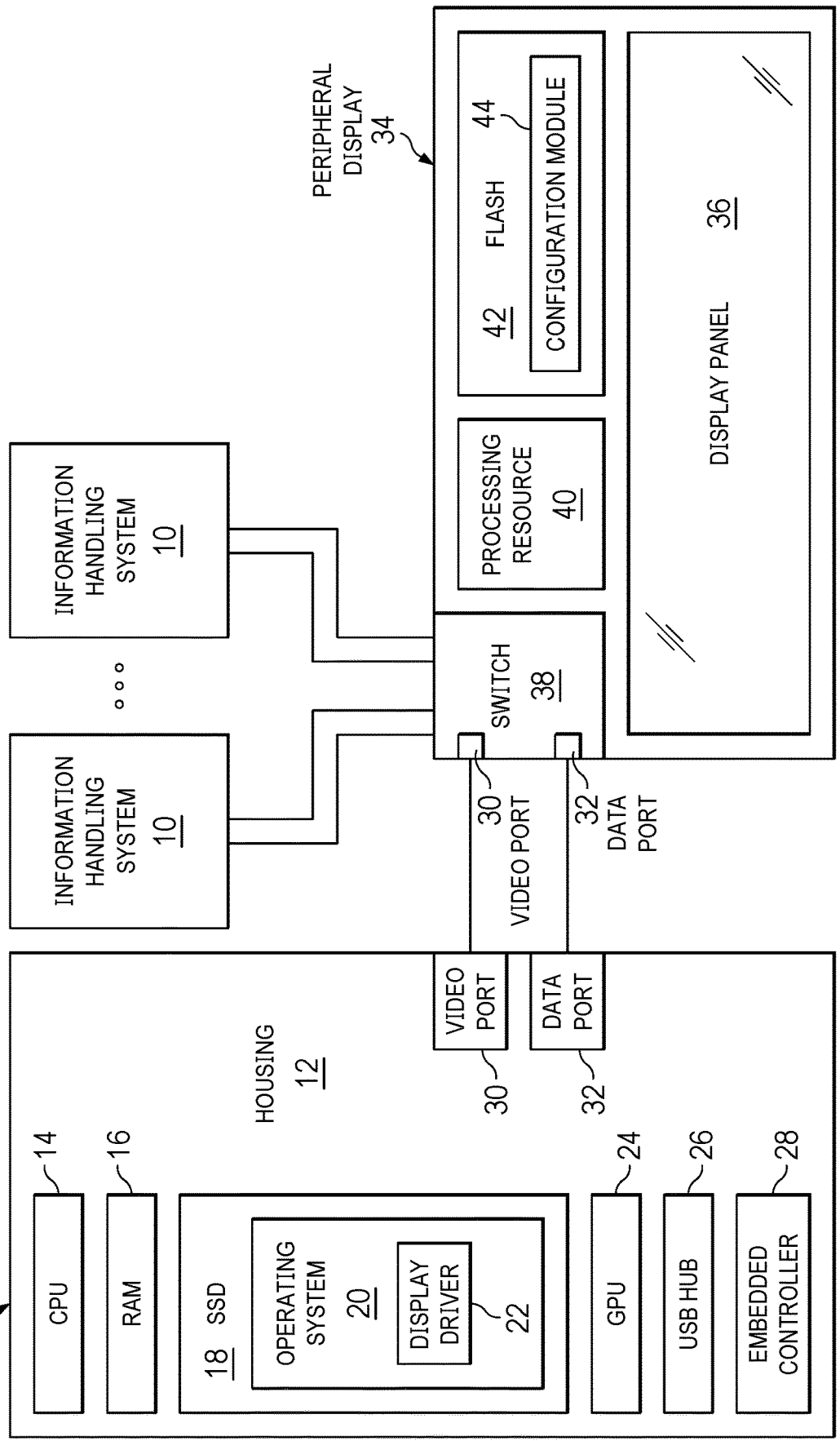
FIG. 1 depicts a block diagram of an information handling system and display KVM switch that cooperatively exchange identifiable information to associate video and data ports.

Referring now to FIG. 1, a block diagram depicts an information handling system 10 and display KVM switch 38 that cooperatively exchange identifiable information to associate video and data ports. In the example embodiment, information handling system 10 has a desktop configuration with fixed position housing 12 that contains processing components that cooperate to process information. A central processing unit (CPU) 14 executes instructions to process information in cooperation with a random access memory (RAM) 16 that stores the instructions and information. A solid state drive (SSD) 18 provides persistent memory to store instructions during power down periods. For example, SSD 18 stores an operating system 20 having a display driver 22 that are retrieved at power up to RAM 16 for execution on CPU 14. A graphics processing unit (GPU) 24 further processes information to define visual images for presentation at a display panel 36, such as by defining pixel values that are scanned to the display panel. A Universal Serial Bus (USB) hub 26 coordinates communicate with external device cables, such as through data ports 32 that comply with USB Type A, B and C standards. An embedded controller (EC) 28 manages physical operations at information handling system 10, such as application of power, maintenance of thermal constraints and interactions with external peripherals like a keyboard and mouse.

In the example embodiment, plural information handling systems 10 interface with a peripheral display 34 having an integrated KVM switch 38 that supports selection of which information handling system 10 presents visual images at display panel 36 and receives inputs from peripherals coupled to peripheral display 34, such as a mouse and keyboard. Although the example embodiment has fixed information handling systems 10, such as desktop systems, in alternative embodiments, portable information handling systems may also couple to KVM switch 38. Each information handling system communicates visual information through a video port 30 to one of plural video ports of KVM switch 38. Each information handling system 10 receives peripheral inputs from one of plural data ports 32 of KVM switch 38 through a cable to a data port 32 of information handling system 10. For instance, video ports 30 may include HDMI, DisplayPort, USB Type C or other standard video protocol arrangements; data ports 32 may include USB Type A, B and C or similar standard data protocol arrangements. KVM switch 38 includes a processing resource 40 and a flash non-transitory memory 42 that stores a configuration module 44 to coordinate communication of information with a selected of the plural information handling systems 10. For example, when plural information handling systems 10 couple to KVM switch 38 data ports 32 and video ports 30, configuration module 44 in cooperation with display driver 32 associates video ports 30 with data ports 32 so that the same information handling system 10 that presents visual images at display panel 36 also receives data from peripherals coupled to KVM switch 38. Automation of this association by configuration module 44 may be performed in a number of ways, as described in greater depth below.

Figure 2:
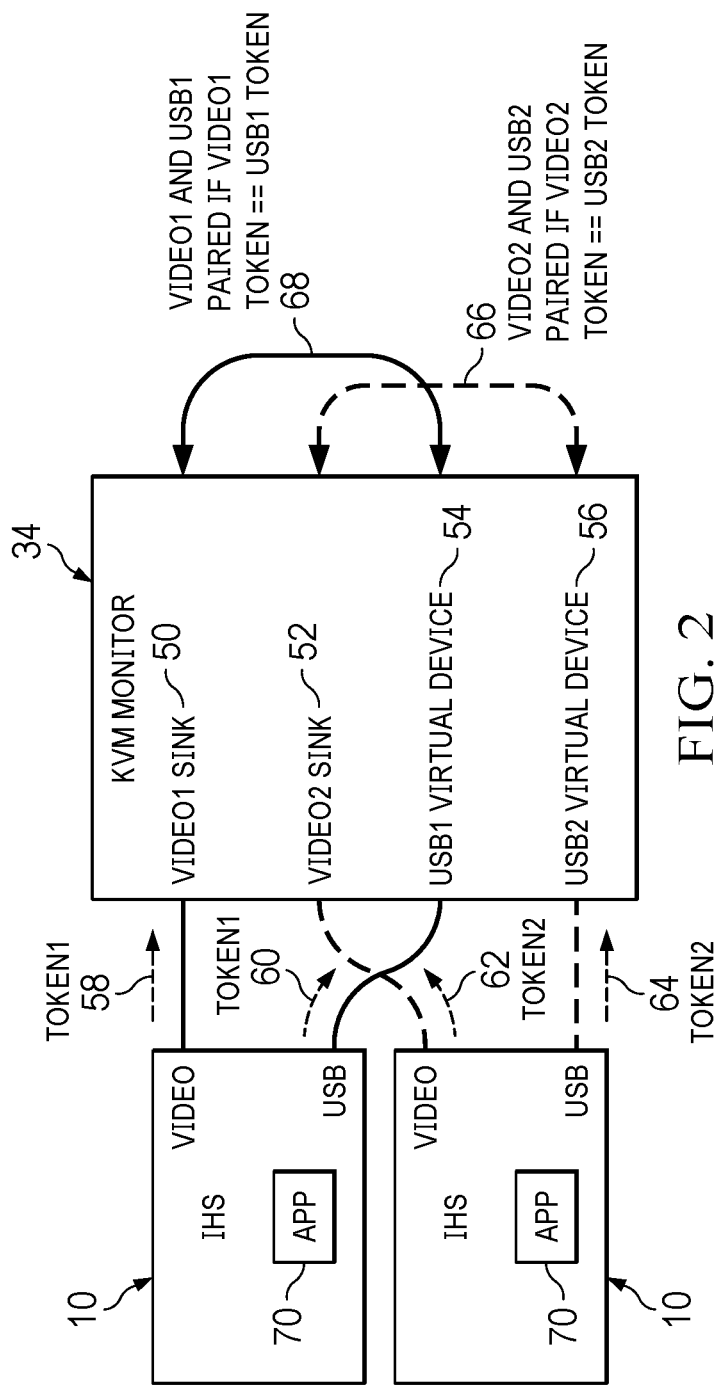
FIG. 2 depicts a block diagram of a system that coordinates unique token communication from an information handling system video and data port to identify associated KVM switch ports.

Referring now to FIG. 2, a block diagram depicts a system that coordinates unique token communication from an information handling system video and data port to identify associated KVM switch ports. In the example embodiment, first and second information handling systems 10 each couple to a data port and a video port of a KVM display 34. A unique digital token is generated by a software application executing on each information handling system 10, such as a display manager application and/or display driver, and sent to KVM display 34 over both the data and video interfaces, such as with a DDCCI auxiliary channel and USB data interface. KVM display 34 applies the unique token to associate video and data ports that share the unique token so that selection of an information handling system for presentation of visual information at the display will also select the information handling system to receive data through the data port, such as keyboard and mouse peripherals that interface with the KVM switch integrated in the display.

In the specific example of FIG. 2, an application 70 executing on the first information handling system 10 sends a unique Token1 from a video interface 58 to a video sink 50 of KVM display 34, and also sends the unique Token1 from a USB data interface 60 to a USB virtual device 54 of KVM display 34. The application 70 executing on a second information handling system 10 sends a unique Token1 from a video interface 62 to a video sink 52 of KVM display 34, and also sends the unique Token2 from a USB data interface 64 to a USB virtual device 56 of KVM display 34. A configuration module executing on a processing resource of KVM display 34 detects the unique token and matches a first set 68 of video and data ports to the first information handling system and a second set of video and data ports 66 to the second information handling system. The unique tokens may include any identifiable factor to support matching of video and data ports. The communication of a unique token through a video interface can take place with an auxiliary communication path, such as that defined for DisplayPort. Alternatively, a video stream can include the unique token, which the display stores in a buffer to read, such as with a QR code or OCR logic. To prevent disruption of other visual images, the token data may be sent in a single display pixel scan with coordination by the USB data for the display to know which buffer to save for analysis.

Figure 3:
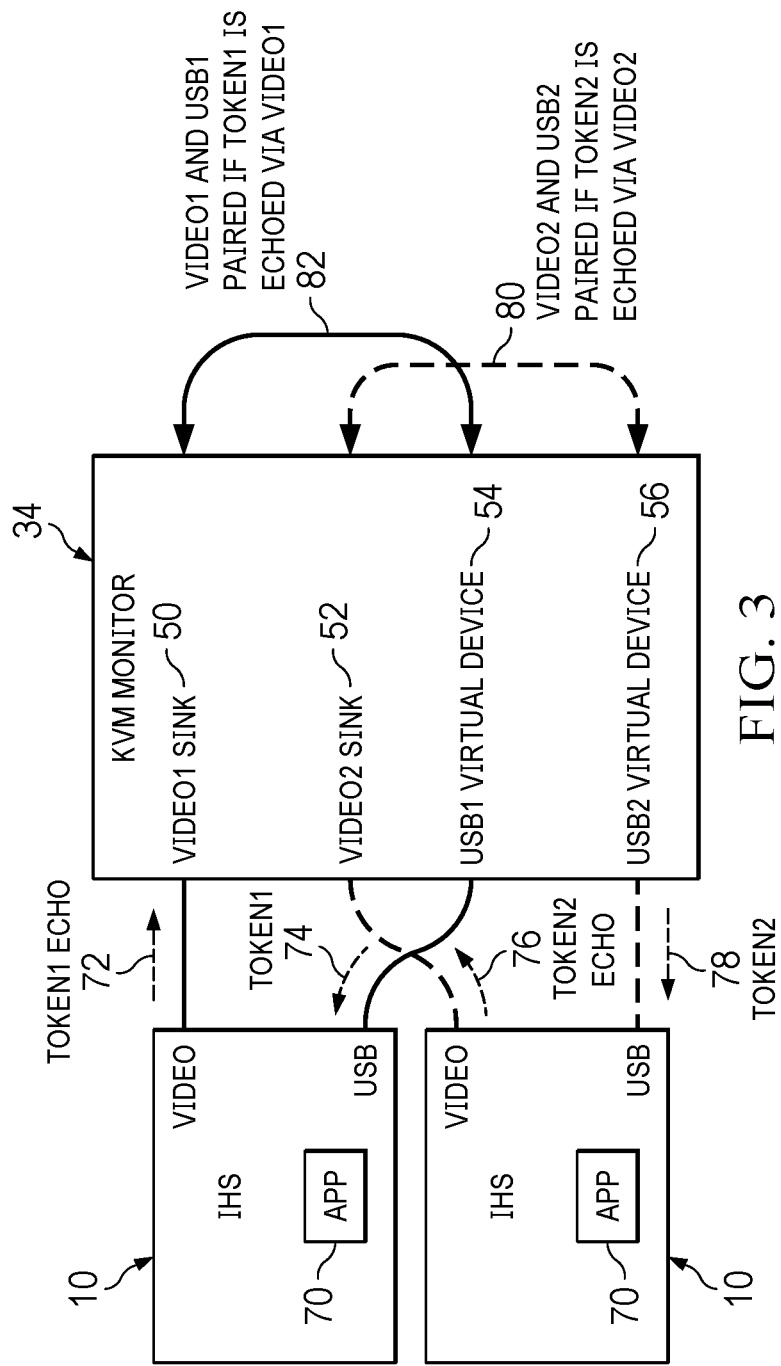
FIG. 3 depicts a block diagram of a system that coordinates unique token communication from a KVM switch data port to an information handling system data port for return by an information handling system video port to the KVM switch video port.

Referring now to FIG. 3, a block diagram depicts an alternative system that coordinates unique token communication from a KVM switch data port to an information handling system data port for return by an information handling system video port to the KVM switch video port. In the example embodiment, KVM display 34 sends a first unique token from a first virtual device 54 through a first USB data interface 74 and a second unique token from a second virtual device 56 through a second USB data interface 78. The first information handling system 10 application 70 responds to the unique token by sending an echo of the unique token back to KVM display 34 through a video interface 72. The second information handling system 10 application 70 responds to the second token by echoing it back through a video interface 76. When the first and second tokens arrive at video sinks 50 and 52, configuration logic in KVM display 34 correlates a first set 80 of video and data interfaces to the second information handling system and a second set 82 of video and data interfaces to the first information handling system.

Figure 4:
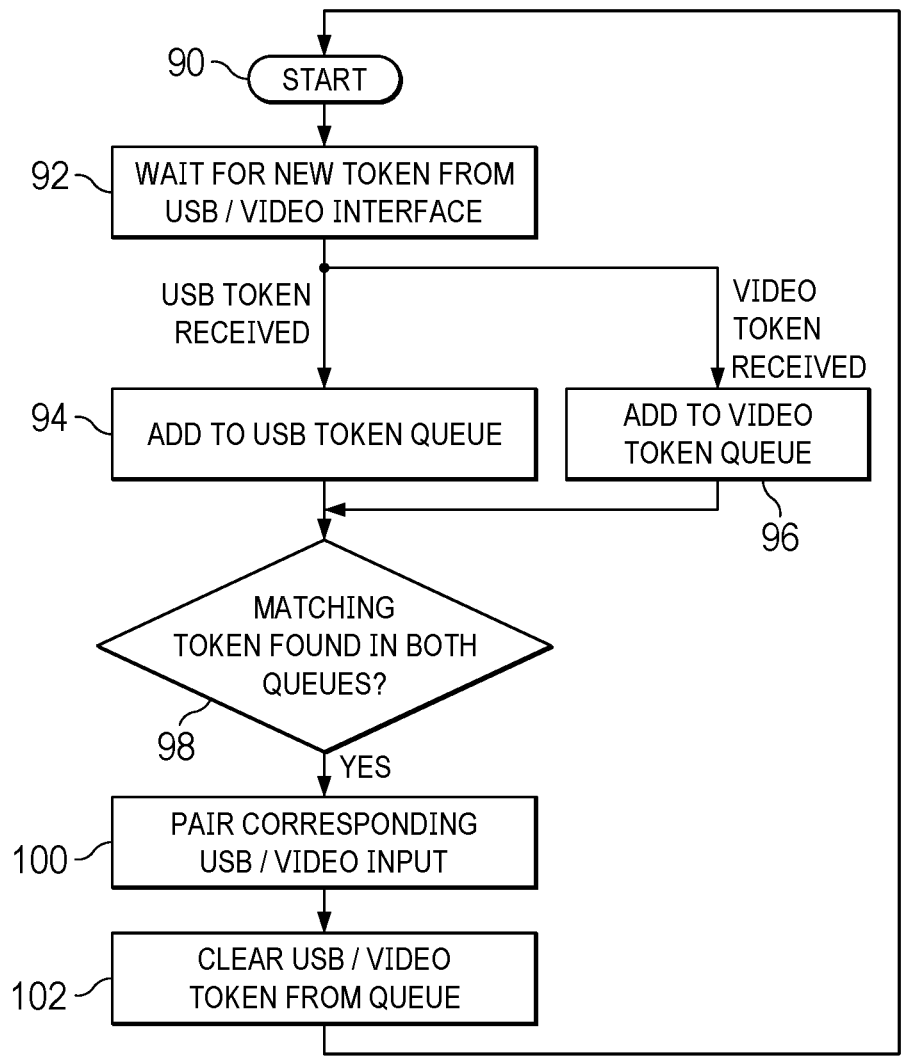
FIG. 4 depicts a flow diagram of a process for coordinating video and data port associations for an information handling system at a KVM switch.

Referring now to FIG. 4, a flow diagram depicts a process for coordinating video and data port associations for an information handling system at a KVM switch of a KVM display. The process starts at step 90, such as by detection of new cable connections to the KVM switch ports. At step 92, the process waits for new token communications from USB data and/or video interfaces. When a token is received through the data interface, the process continues to step 94 to add the token to the USB data token queue. When a token is received at the video interface, the process continues to step 96 to add the token to the video token queue. Each token queue keeps a table entry of the token value and the corresponding video or USB port index where the token was received. At step 98 a determination is made of whether matching tokens are found in the video and data queues. If matching tokens are found, the process continues to step 100 to pair the corresponding video and data ports as associated with the same information handling system. The process then continues to step 102 to clear the video and data tokens from the queue and returns to step 90 to monitor for additional device interfaces.

Figure 5:
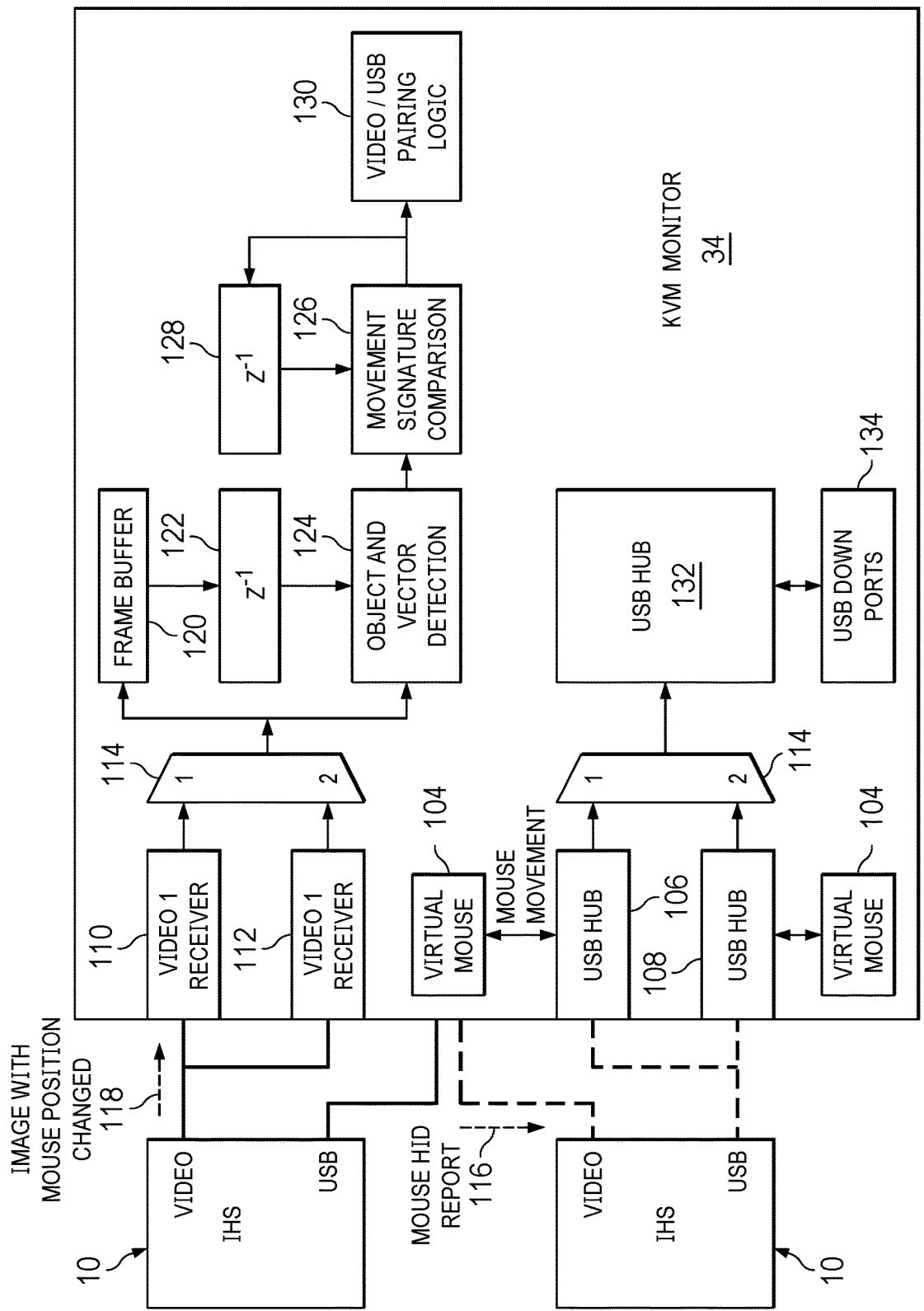
FIG. 5 depicts a block diagram of a system that coordinates association of an information handling system with KVM switch ports by communication of virtual mouse inputs and cursor movements.

Referring now to FIG. 5, a block diagram depicts a system that coordinates association of an information handling system with KVM switch ports by communication of virtual mouse inputs and cursor movements. The KVM display 34 includes a virtual mouse device that generates a series of known signature movements detectable by image processing logic that tracks mouse cursor movements corresponding to the mouse movements. When a new data or video interface is detected, a virtual mouse 104 generates a series of small signature movements to the mouse pointer, such as ten incremental steps left followed by 10 incremental steps right so that the mouse ends at its starting position. The operating system of the information handling system 10 detects the mouse movements and renders video with the changing mouse pointer position. Logic on the display detects the moving mouse pointer and matches the relative change of mouse position against the movement signature of the virtual mouse. This tracking may be aided by a message from the virtual mouse to the video portion of the display to look for the virtual mouse. When a mouse movement detected in the video matches the virtual mouse signature, the data and video ports are paired as associated with the same information handling system. If the virtual mouse movement is not detected, a different video stream may be searched until all ports are related.

In the example embodiment, at detection of a cable connection to USB hub port 106 and 108, a virtual mouse 104 generates a virtual mouse HID report 116 that is communicated to the connected information handling system 10. The information handling system generates an image with mouse position changes 118 that is communicated to a video receiver 110 or 112 and switched when selected to a frame buffer 120 for storage and communication through a register 122 in increments to an object and vector detection module 124, which searches for the mouse signature. In part, a command from a virtual mouse that a signature is being sent can trigger the storage of video in frame buffer 120 for analysis. A movement signature comparison module 126 increments through a register 128 to compare detected mouse movements with the defined signatures of the virtual mouse devices to identify the presence of the virtual mouse and which virtual mouse generated the signatures so that the originating data port is known. Once a mouse movement signature is detected, a video/USB pairing logic 130 associates the USB and video ports based upon which video port detects which of plural virtual mouse signatures. For instance, left movement followed by right movement can indicate USB hub port 106 while right movement followed by left movement can indicate USB hub port 108. Once the association is made, peripheral devices coupled to USB down ports 134, such as a mouse or keyboard, a switched to the information handling system having a video interface.

Figure 6:
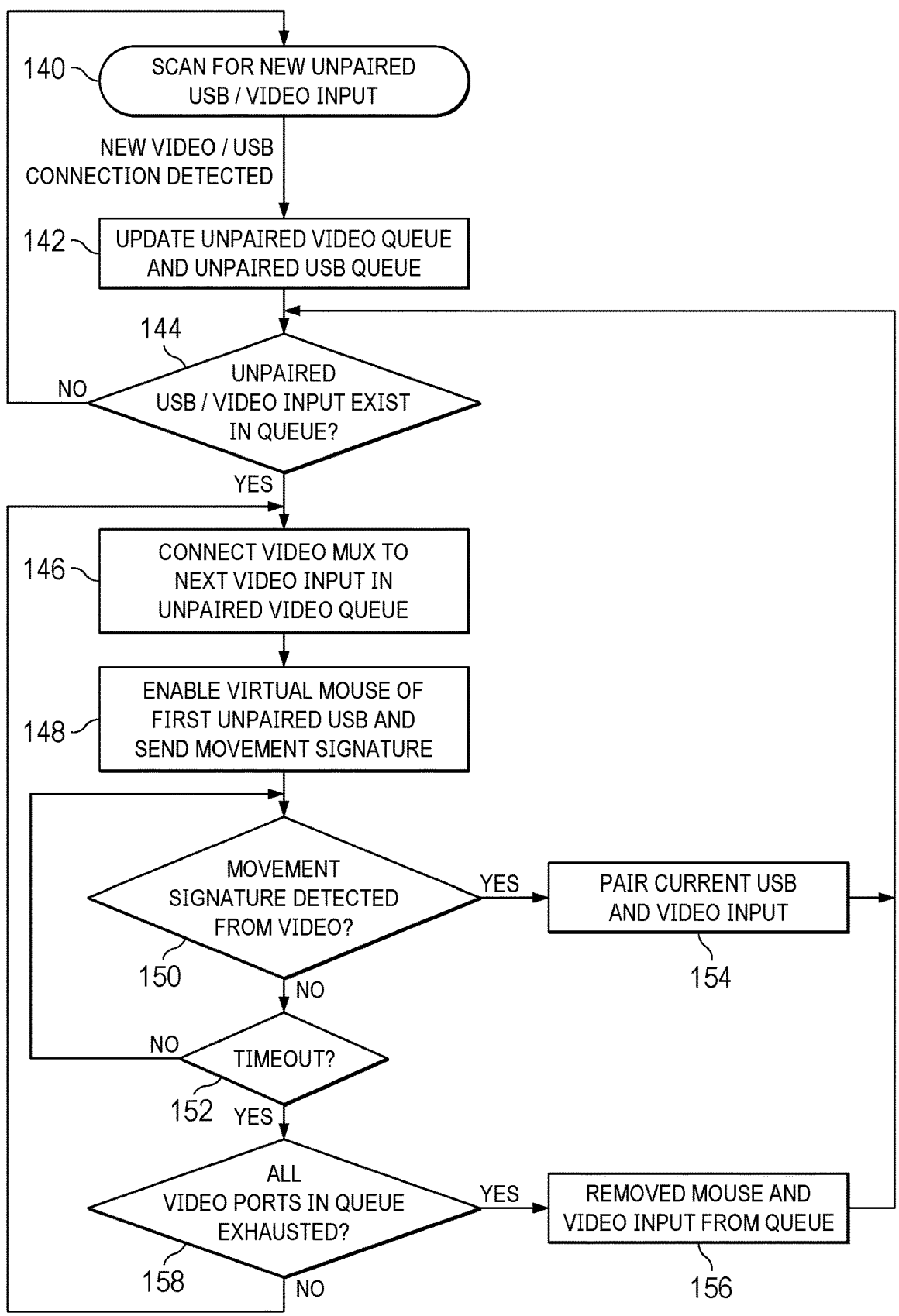
FIG. 6 depicts a flow diagram of a process for association of KVM switch ports with an information handling system through communication of virtual mouse inputs.

Referring now to FIG. 6, a flow diagram depicts a process for association of KVM switch ports with an information handling system through communication of virtual mouse inputs. The process starts at step 140 with a scan for unpaired USB and video inputs. When a new video/USB connection is detected, the process continues to step 142 to update the unpaired video queue and unpaired USB queue. At step 144 a determination is made of whether an unpaired USB/video input exists in the queue. If the not, the process returns to step 140 to continue monitoring for unpaired USB and/or video. If an unpaired USB/video is detected at step 144, the process continues to step 146 to connect the video multiplexor to the first input in the unpaired video queue. At step 148 the virtual mouse of the unpaired USB is enabled to send a movement signature. In one embodiment, the signature is sent once and copied to a video buffer. In an alternative embodiment the signature is looped for a defined time. At step 150 a determination is made of whether the mouse signature is detected in the video of the video port for a timeout at 152. If the signature is detected at step 150, the process continues to step 154 to pair the current USB data and video ports and return to step 144. If a timeout occurs at step 152, the process continues to step 158 to determine if all video ports in the queue are exhausted. If not, the process returns to step 146. If all video ports in the queue are exhausted, the process continues to step 156 to remove the mouse and video input from the queue and returns to step 144 to determine if additional ports should be checked.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   a processor disposed in the housing, the processor operable to execute instructions that process information;
   a memory disposed in the housing and interfaced with the processor, the memory operable to store the instructions and information;
   a persistent storage device interfaced with the processor and having non-transitory memory;
   a video port interfaced with the processor and operable to communicate visual information to a display for presentation as visual images;
   a data port interfaced with the processor and operable to communicate information to external devices;
   a peripheral display external to the housing; and
   a keyboard, video, mouse (KVM) switch integrated in the peripheral display and having plural switch video ports, plural switch data ports, a switch, a processing resource and a non-transient memory storing instructions that when executed on the processing resource cause:
   communication of unique information through the plural switch video ports and the plural switch data ports with the video port and the data port; and
   application of the unique information received at the plural switch data ports and the plural switch video ports to associate one of the plural switch data ports with one of the switch video ports and with the information handling system video port and the data port.

2. The information handling system of claim 1 wherein:
   the unique information comprises a unique token communicated from the switch; and
   the application of the unique information comprises an echo of the unique token back to the switch.

3. The information handling system of claim 2 wherein the unique token is communicated in part through an auxiliary data link of the video port.

4. The information handling system of claim 1 wherein:
   the unique information comprises mouse inputs having a defined set of positions.

5. The information handling system of claim 4 wherein the instructions:
   generate the mouse inputs at the switch; and
   detect the mouse inputs in video information communicated to the switch.

6. The information handling system of claim 5 wherein the mouse inputs comprise:
   plural cursor steps in a first direction; and
   plural cursor steps in a second direction opposite the first direction.

7. The information handling system of claim 6 wherein the plural cursor steps in the first direction and the second direction complete at a neutral cursor position.

8. The information handling system of claim 5 further comprising:
   a frame buffer interfaced with the switch video ports operable to store the visual information; and
   instructions that when executed on the processing resource cause a comparison of the frame buffer and the mouse inputs.

9. The information handling system of claim 8 wherein the instructions cause synchronization of mouse inputs from the switch with storage of the visual information in the frame buffer.

10. A method for configuring an information handling system to interface with a display having an integrated KVM switch, the method comprising:
    communicating unique information between the information handling system and the integrated KVM switch;
    echoing the unique information between the information handling system and the integrated KVM switch; and
    automatically associating the information handling system with one of plural switch video ports and one of plural switch data ports by comparing the unique information of the communicating and the echoing.

11. The method of claim 10 wherein:
    the information handling system communicates a unique token from a video port of the information handling system to a video port of the integrated KVM switch;
    in response to the unique token, the switch communicates the unique token from a data port of the integrated KVM switch to a data port of the information handling system.

12. The method of claim 10 wherein:
    the integrated KVM switch communicates a unique token from a data port of the integrated KVM switch to a data port of the information handling system;
    in response to the unique token, the information handling system communicates the unique token from a video port of the information handling system to a video port of the integrated KVM switch.

13. The method of claim 10 further comprising:
    generating virtual mouse inputs at the integrated KVM switch;
    communicating the virtual mouse inputs as the unique information from a data port of the integrated KVM switch to a data port of the information handling system; and
    communicating the virtual mouse inputs from a video port of the information handling system to a video port of the integrated KVM switch.

14. The method of claim 13 further comprising:
    storing the video information in a video buffer; and
    searching the video buffer for a pattern of cursor movements that match the virtual mouse inputs.

15. The method of claim 10 further comprising:
    generating virtual mouse inputs at the information handling system;
    communicating the virtual mouse inputs as the unique information from a video port of the integrated KVM switch to a video port of the information handling system as cursor movements; and communicating the cursor movements as mouse inputs from a data port of the integrated KVM switch to a data port of integrated KVM switch of the information handling system.

16. The method of claim 10 wherein the virtual mouse inputs comprise plural cursor steps in plural directions that start and complete at the same position.

17. A display comprising:
a display panel operable to present visual information as visual images; and
a keyboard, video, mouse (KVM) switch coupled with the display panel and having plural video ports, plural data ports, a switch, a processing resource and a non-transient memory storing instructions that when executed on the processing resource cause:
communication of unique information through the plural video ports and the plural data ports with a video port and a data port of an information handling system; and
application of the unique information received at the switch to associate one of the plural data ports with one of the plural video ports and with the video port and the data port of the information handling system.

18. The display of claim 17 wherein:
the switch communicates a unique token from a data port of the switch to a data port of the information handling system;
in response to the unique token, the information handling system communicates the unique token from a video port of the information handling system to a video port of the switch.

19. The display of claim 17 wherein:
the switch communicates a virtual mouse input from a data port of the switch to a data port of the information handling system;
in response to the virtual mouse input, the information handling system communicates a mouse cursor movement from a video port of the information handling system to a video port of the switch.

20. The display of claim 19 wherein the processing resource detects the mouse cursor movement from a video buffer storing video information communicated to the switch video port.

* * * * *